US012736408B2

(12) United States Patent
Hu

(10) Patent No.: US 12,736,408 B2
(45) Date of Patent: Sep. 15, 2026

(54) LIGHTPIPE FOR HIGH TEMPERATURE SUBSTRATE PROCESSING

(71) Applicant: VEECO INSTRUMENTS INC., Plainview, NY (US)

(72) Inventor: Ji-Dih Hu, San Jose, CA (US)

(73) Assignee: VEECO INSTRUMENTS INC., Plainview, NY (US)

(*) Notice: Subject to any disclaimer, the term of this patent is extended or adjusted under 35 U.S.C. 154(b) by 314 days.

(21) Appl. No.: 18/489,460

(22) Filed: Oct. 18, 2023

(65) Prior Publication Data

US 2024/0142310 A1 May 2, 2024

Related U.S. Application Data

(60) Provisional application No. 63/381,021, filed on Oct. 26, 2022.

(51) Int. Cl.
*G01J 5/0821* (2022.01)
*G01J 5/0818* (2022.01)

(52) U.S. Cl.
CPC .......... *G01J 5/0821* (2013.01); *G01J 5/0818* (2013.01)

(58) Field of Classification Search
CPC .............................. G01J 5/0821; G01J 5/0818
USPC .................................................. 374/131, 120
See application file for complete search history.

(56) References Cited

U.S. PATENT DOCUMENTS 4,129,356 A * 12/1978 Oestreich ............. G02B 6/4402 385/104
4,300,815 A * 11/1981 Malsot ................. G02B 6/3841 385/81
5,830,277 A 11/1998 Johnsgard et al.
6,053,632 A 4/2000 Leininger
6,200,634 B1 3/2001 Johnsgard et al.
6,226,453 B1 * 5/2001 Yam .......................... G01J 5/08 219/390
6,325,858 B1 12/2001 Wengert et al.
8,147,137 B2 4/2012 Patalay et al.
10,930,530 B2 2/2021 Hu et al.
11,342,209 B2 5/2022 Hu et al.
(Continued)

FOREIGN PATENT DOCUMENTS

WO 2000029799 A1 5/2000

OTHER PUBLICATIONS

International Search Report and Written Opinion in PCT Application No. PCT/US23/77165, mailed Apr. 23, 2024 (9 pages).

*Primary Examiner* — Mirellys Jagan
(74) *Attorney, Agent, or Firm* — Leason Ellis LLP

(57) ABSTRACT

A substrate processing system in accordance with one embodiment includes a processing chamber and an optical pyrometer assembly to measure an emitted thermal radiation originating substantially from a portion of target surfaces. The optical pyrometer includes a lightpipe that comprises a core and a hollow sheath surrounding the core. The core and the sheath are concentric with one another. The sheath is formed by a chemical vapor deposition process and includes local protrusions within a hollow interior thereof to maintain a position of the core within the sheath. In particular, the local protrusions are formed so as to center at least a distal end portion of the core within the sheath. A temperature of the target surface is determined from an intensity of a portion of the emitted thermal radiation near at least one wavelength.

10 Claims, 8 Drawing Sheets

(56) References Cited

U.S. PATENT DOCUMENTS

2010/0054720 A1* 3/2010 Hunter .............. H01L 21/67248 392/416
2010/0124248 A1 5/2010 Patalay et al.
2010/0247763 A1 9/2010 Coutu et al.
2019/0228997 A1* 7/2019 Hu ............................ G01J 5/10

* cited by examiner

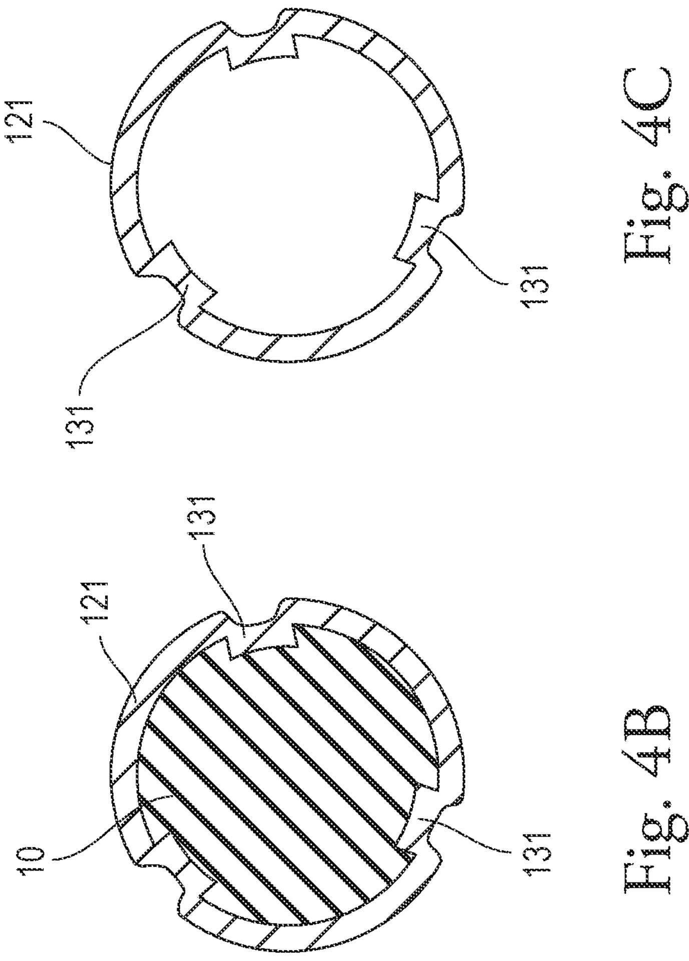
121
131
131
Fig. 4C
131
121
10
131
Fig. 4B
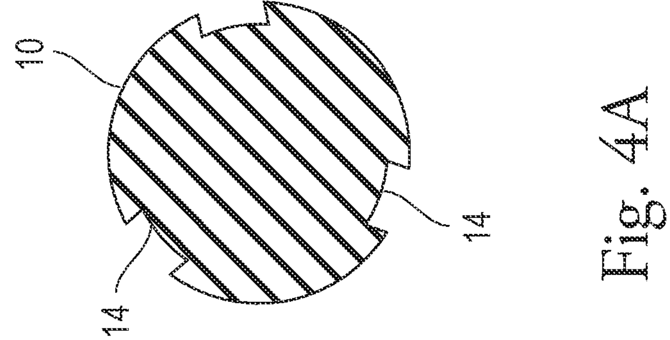
10
14
14
Fig. 4A

LIGHTPIPE FOR HIGH TEMPERATURE SUBSTRATE PROCESSING

CROSS-REFERENCE TO RELATED PATENT APPLICATIONS

This application is based on and claims priority to U.S. Provisional Patent Application 63/381,021, filed Oct. 26, 2022, the entire contents of which is incorporated by reference herein as if expressly set forth in its respective entirety herein.

TECHNICAL FIELD

The present disclosure is directed to semiconductor processing equipment and more particularly, to a concentric lightpipe for high temperature substrate processing applications.

BACKGROUND

Semiconductor processing equipment is used in the deposition, patterning and treatment of thin films and coatings. A conventional substrate processing chamber provides a pedestal or chuck to support the substrate for processing. In the processing of semiconductor device materials, such as a semiconductor wafer, one of the critical process parameters is temperature. Repeatable, precise, and process-independent measurements of the wafer temperature are among the most important requirements of semiconductor processing equipment in integrated circuit manufacturing.

In some applications, contact temperature sensors, such as thermocouples, can be used to measure temperature. However, these sensors are not well-suited to many wafer processing environments. As a result, other types of temperatures measurements are needed for more extreme wafer processing environments. For example, noninvasive temperature measurement techniques, such as optical pyrometry, have been used in many wafer processing applications, including but not limited to rapid thermal processing (RTP). Unlike contact based temperature measuring devices, using an optical pyrometer to measure temperature does not require contact with the wafer. As is known, optical pyrometers measure temperature based upon electromagnetic radiation (light) the is emitted from the object (wafer). Conventional optical pyrometers use an optical fiber, lightpipe, lens or other light collecting device to transmit light to a light sensitive device that measures the flux density or intensity of the light emitted from the object (wafer, or susceptor). From these measurements, the temperature of the object can be calculated.

A lightpipe is a rod of sapphire, quartz, or other optical materials, that typically has a diameter of about 1-2 mm and is used to collect/transmit light in a wide spectral range (UV to IR). The light collection/transmission is based on the same working principle as an optical fiber, but normally without a cladding layer. One of the advantages of a lightpipe is that it can be inserted through a small hole, so it is very suitable for cases in which a larger viewport is not possible or not allowed. A lightpipe is a non-imaging sensor and its spot size is in proportion to its working distance, which is the major reason lightpipes are often used with their tips in a close proximity to the target to be measured. One advantage of a sapphire lightpipe is that it collects and delivers more signal than a typical size lens and enables lower temperature measurement. While the main application for a lightpipe is pyrometry, lightpipes can also be used as a sensor head in many other applications.

The use of a lightpipe in deposition processes also necessitates the use of continuous lightpipe purging. The flat front surface and the cylindrical surface of the lightpipe are polished surfaces. The flat front surface is where light/IR enters the lightpipe and the cylindrical surface forms the interface of the total internal reflection to trap the light/IR in the lightpipe. A dirty flat front surface can reduce transmission and results in signal attenuation. A dirty cylindrical surface could show scattering and that could, in turn, result in either signal loss, or stray light introduction into the lightpipe. For longer term use, the lightpipe surfaces must be kept clean, especially in applications with deposition processes typically seen in semiconductor manufacturing. To keep such surfaces clean, the most common technique is to use a sheath around the lightpipe and with inert gas purging using the space between the lightpipe rod and the sheath. By controlling the purging flow to be laminar at the lightpipe end face, the front surface is protected from contamination.

In view of the foregoing, existing lightpipe design uses a concentric layout. However, because of the difficulty of controlling concentricity at the free end of a slender and long lightpipe, the lightpipe tip will be eccentric to the sheath and has a contact point with the sheath. The contact point blocks the purging flow locally and results in a non-uniform purge. Such non-uniform purging further results in localized surface contamination and shortens lifetime between cleanings. To control the concentricity, one of the prevailing designs is to use a quartz sheath with dimples to control the concentricity. A concentric design makes sure that the sheath is always concentric to the lightpipe.

SUMMARY

A substrate processing system in accordance with one embodiment includes a processing chamber and an optical pyrometer assembly to measure an emitted light originating substantially from a portion of a target surface. The optical pyrometer includes a lightpipe that comprises a core and a hollow sheath surrounding the core. The core and the sheath are concentric with one another. The sheath is formed by a chemical vapor deposition process and includes local protrusions within a hollow interior thereof to maintain a position of the core within the sheath. In particular, the local protrusions are formed so as to center at least a distal end portion of the core within the sheath. A temperature of the target surface is determined from an intensity of a portion of the emitted thermal radiation near at least one wavelength or multiple wavelengths.

BRIEF DESCRIPTION OF THE DRAWING FIGURES

FIG. 4A is a cross-sectional view of a second mandrel;

FIG. 4B is a cross-sectional view showing a second sheath grown on the second mandrel;

FIG. 4C is a cross-sectional view of the second sheath formed on the second mandrel; after the mandrel is removed;

DETAILED DESCRIPTION OF CERTAIN EMBODIMENTS

As discussed herein, many semiconductor processes operate at high temperature and therefore, the sensor head (lightpipe) that is used to measure temperature of a target surface must operate in such high temperatures.

Figure 9:
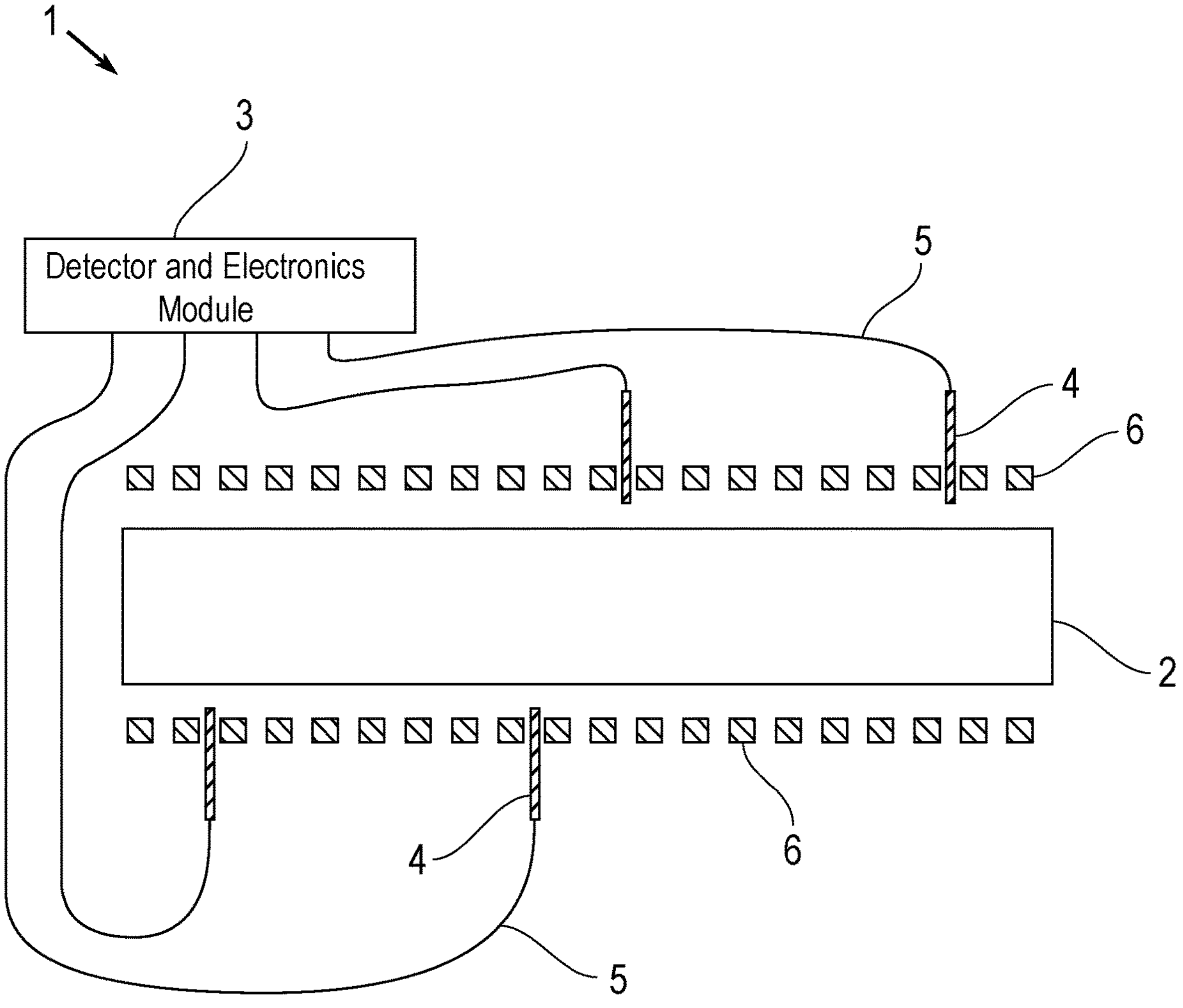
FIG. 9 is a schematic of exemplary semiconductor processing equipment.

FIG. 9 is a schematic showing exemplary semiconductor processing equipment 1. In general, the equipment 1 includes a process chamber 2 including an inductive heating coil 6. A detector and electronics module 3 is provided and is operatively coupled to one or more lightpipes 4. For example, each lightpipe 4 can be operatively coupled to the module 3 by a fiber optic cable 5. As described below, the lightpipe 4 is designed to measure the temperature of a target surface, such as the temperature of a particular region within the process chamber 2. In FIG. 9, there are multiple (4) lightpipes 4 shown in different positions within the process chamber 2 to measure temperatures in different regions within the process chamber 2.

As is known, the use of pyrometry for non-invasive temperature measurement and control is a necessity for some semiconductor processing applications such as Rapid Thermal Processing (RTP). Pyrometry involves measuring, light emission from a silicon wafer using, an optical detector in a specified spectral band and to compute wafer temperature based on the measured (emitted) thermal radiation data. The electronics module 3 includes an optical detector that is configured to receive an output from the optical assembly, including the lightpipe, and to generate at least one signal representative of the radiation, and a temperature circuit that transforms the at least one signal into a temperature value. In this way, the temperature of the target surface is obtained and displayed to the user on a display or the like.

For example, an apparatus or system for measuring a temperature of an assembly internal to the process chamber 2 can include the lightpipe; an optical assembly that is configured to collimate, filter and focus the radiation (e.g., infrared radiation) from one end of the lightpipe; an optical detector that is configured to receive an output from the optical assembly and to generate at least one signal representative of the (infrared) radiation; and a temperature circuit that transforms the at least one signal into a temperature value. In addition, a controller can be configured to receive the temperature value from the temperature circuit and to adjust one or more processes of the process chamber 2 based on the temperature value. In one embodiment, the detector and electronics module 3 is configured to receive the thermal radiation signal and convert it into analog signal, then digitize it and calculate the temperature based on stored calibration data as is known in the industry.

The electronics module 3 can be a commercially used device that is suitable for use with the present application and can be used with lightpipes that can collect/transmit light in a wide spectral range (UV to IR). For example, in one embodiment, the lightpipe (pyrometer assembly) is used to gather infrared radiation from an internal assembly of the process chamber 2.

Concentric Design

As discussed herein, a concentric design is desired in order to properly position the lightpipe within the surrounding sheath. The sheath is configured to enclose the lightpipe while having an opening at an end of the lightpipe that is configured to allow radiation (e.g., infrared radiation) into the lightpipe. The sheath allows for a flow of a purge gas to reduce contamination of the lightpipe. As further mentioned, dimples can be used to provide the concentric nature of the lightpipe and the surrounding sheath.

High Temperature Application

Sapphire is a preferred choice for a lightpipe in many applications since sapphire has a high melting point and therefore, the main problem remains with the use of a quartz sheath in high temperature applications. Above a certain high temperature point, quartz sags by its own weight. With the same grade of quartz, sagging is a function of temperature and time. At 1200 degrees C., a low-OH quartz tube with a 135 mm ID and a 2 mm wall thickness can collapse more than 15 mm in less than 50 hours. Other challenges remain with the use of quartz including that quartz is a poor thermal conductor so it is difficult to cool the tip. Based on these limitations, in high temperature processes, such as SiC epitaxy, which typically run around 1600 C, the use of a quartz sheath is not ideal.

High Temperature Material Selection for Lightpipe Sheath

Single-crystal sapphire tube is currently used as a lightpipe sheath in high temperature applications. However, the manufacturing method for a dimpled quartz sheath does not work for sapphire and a concentric design for sapphire sheath is currently lacking. Therefore, there is a need for an alternative material that can be used as a sheath that is suitable for high temperature applications.

One such material is pure silicon carbide (SiC) which has high service temperature and excellent thermal conductivity. Silicon carbide can be grown using a chemical vapor deposition (CVD) process. CVD SiC is available with different resistivity values. The low resistivity grade is commonly used because it allows relatively easy machining by electro-discharge machining (EDM) and can be used in non-inductively heated systems. Unfortunately, in reactors with induction heating, the sheath will be heated up by the induction heater. However, high resistivity SiC remains unheated by the induction heater so it is the only grade of CVD SiC that works in inductively heated system.

As mentioned, the present disclosure concerns a substrate processing system, such as a semiconductor processing system (e.g., the system in FIG. 9), that includes a processing chamber that is configured to contain and process a substrate (e.g., wafer). More particularly, the present disclosure is directed to an optical pyrometer assembly to measure emitted thermal radiation originating substantially from a portion of the target surface within the processing chamber.

Optical Pyrometer Sensor/Lightpipe 100

Now referring to FIGS. 1, 2A-2C and 7A-7D, one exemplary optical pyrometer sensor head 100 includes a lightpipe that comprises a core 110 and a hollow sheath 120 surrounding the core 110. The core 110 and the sheath 120 are concentric with one another. As discussed herein, the sheath 120 includes local protrusions 130 within a hollow interior (inner lumen) thereof to maintain a position of the core 110 within the sheath 120. The temperature of the target surface is determined from an intensity of a portion of the emitted light near at least one wavelength.

Core 110

The core 110 can be formed of any suitable optical materials for high temperature applications. For example, the core 110 can be a sapphire rod.

Sheath 120

In accordance with the present disclosure, the sheath 120 is formed of high-resistivity silicon carbide (SiC) and is formed by a chemical vapor deposition process and includes the local protrusions 130. For example, the CVD SiC can be in the form of undoped/minimum doped CVD SiC. High-resistivity SiC can be a material that has a resistivity of approximately $10^6$ (1E6) ohm-cm or higher at room temperature.

The local protrusions 130 are designed to locate and center the core 110 within the sheath 120. More specifically, the local protrusions 130 act as a centering mechanism to center at least a portion of the core 110 that is disposed within the sheath 120. In particular, the sheath 120 is a hollow structure with an inner lumen and the local protrusions 130 are formed within the inner lumen along an inner surface of the sheath 120. The local protrusions 130 extend in a radially inward direction to provide select contact (contact points) between the core 110 and the sheath 120. As illustrated and described in more detail herein, the local protrusions 130 can be in the form of discrete (convex) bumps formed circumferentially along the interior of the sheath 120.

The local protrusions 130 also define an annular space 135 between the core 110 and the sheath 120. The chemical vapor deposition process used to manufacture the sheath 120 is described in greater detail below.

Optical Pyrometer Sensor/Lightpipe 101

FIGS. 3, 4A-4C and 8 illustrate an optical pyrometer sensor 101 that is very similar to the optical pyrometer 100 and includes a lightpipe that comprises the core 110 and a hollow sheath 121 surrounding the core 110. The core 110 and the sheath 121 are concentric with one another. As discussed herein, the sheath 121 includes local protrusions 131 within a hollow interior (inner lumen) thereof to maintain a position of the core 110 within the sheath 121.

Sheath 121

In accordance with the present disclosure, the sheath 121 is formed of silicon carbide (SiC) and is formed by a chemical vapor deposition process and includes the local protrusions 131. The local protrusions 131 are similar to the local protrusions 130 and are designed to locate and center the core 110 within the sheath 121. More specifically, the local protrusions 131 act as a centering mechanism to center at least a portion of the core 110 that is disposed within the sheath 121. The local protrusions 131 extend in a radially inward direction to provide select contact (contact points) between the core 110 and the sheath 121. The local protrusions 131 also define an annular space 135 between the core 110 and the sheath 121. The chemical vapor deposition process used to manufacture the sheath 121 is described in greater detail below.

As illustrated and described in more details herein, the local protrusions 131 can be in the form of discrete ridges or rails that are formed circumferentially and extend longitudinally within the interior of the sheath 121.

CVD Process

SiC is normally grown on a mandrel and is then removed after growing and therefore, further heavy machining of the formed article is not required.

First Manufacturing Method

Now turning to FIGS. 1, 2A-2C and 7A-7D, a first manufacturing method is illustrated and includes the use of a first mandrel 20. The first mandrel 20 can be thought of as being a dimpled mandrel since the first mandrel 20 includes a plurality of small depressions formed along its outer surface. The first mandrel 20 thus has a distal end 21 and an opposite proximal end 23. The first mandrel 20 will traditionally have a cylindrical shape and contains a plurality of dimples 25 that are formed along an outer surface of the first mandrel 20.

For example, the plurality of dimples 25 can be located within one region of the first mandrel 20 and more particularly, the plurality of dimples 25 are located at or near the distal end 21 of the first mandrel 20. The plurality of dimples 25 are formed circumferentially about the first mandrel 20. For example, there are at least two dimples 25 (e.g., spaced 180 degrees apart); however, more common is for the first mandrel 20 to have three or more dimples 25. Preferably, the plurality of dimples 25 are equally spaced apart from one another. Each dimple 25 is in the form of a recessed crater formed in the outer surface of the first mandrel 20. It will be appreciated that the dimples 25 represent the negative (inverse) impression of the local protrusions 130 that are formed as part of the final sheath 120. Each dimple 25 thus corresponds to one local bump or protrusion being formed in the sheath 120. Thus, the selected depth of the dimple 25 is selected in view of the intended and desired size of the local protrusions 130 formed in the final sheath 120 since the degree of the recess formed in the first mandrel 20 directly corresponds to the degree of which the local protrusions 130 protrude (in a radial inward direction) from an inner surface of the sheath 120 as described herein. Moreover, the size of the annular space 135 is determined by the size of the local protrusions 130. In particular, as the height of the local protrusions 130 increases, the size of the annular space 135 likewise increases.

It will also be appreciated that there can be more than one ring of local protrusions 130 that are spaced apart. Each ring of local protrusions (bumps) 130 serves to contact and center the core 110 within the sheath 120. It is important that at least the distal end portion of the core 110 is centered within the distal end of the sheath 120.

The first mandrel 20 can be formed of any number of suitable materials. For example, the first mandrel 20 can be formed of graphite and the plurality of dimples 25 can be machined into the graphite mandrel.

Figure 1:
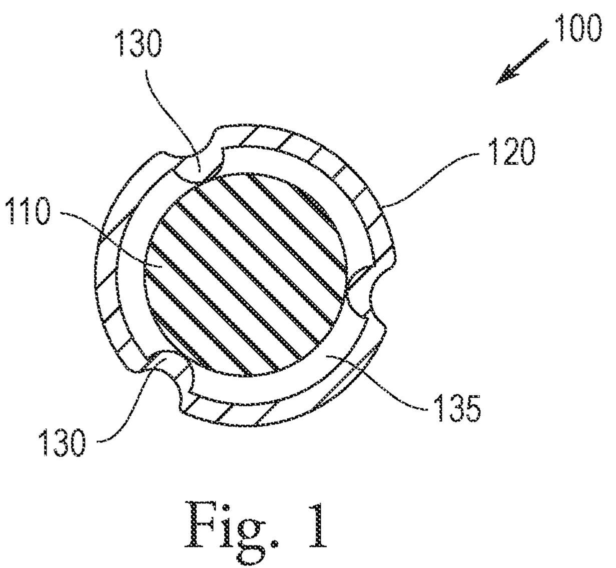
FIG. 1 is a cross-sectional view of a lightpipe according to a first embodiment.
Figures 2A, 2B, 2C:
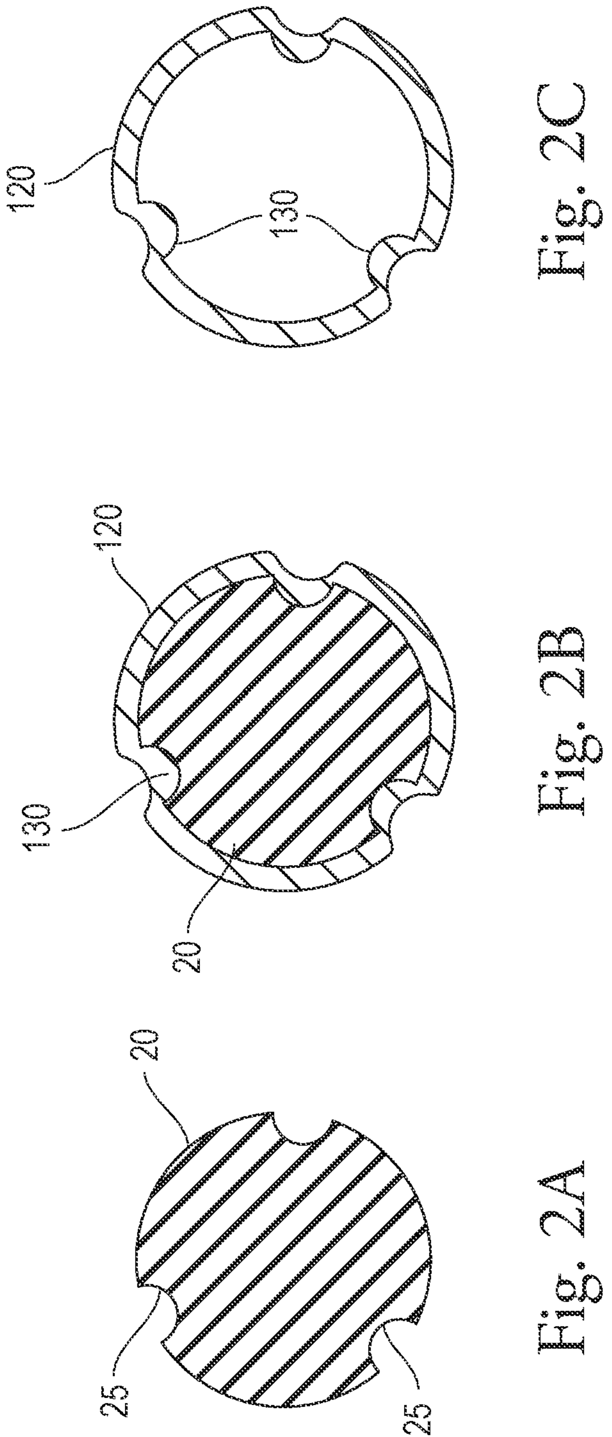
FIG. 2A is a cross-sectional view of a first mandrel.
FIG. 2B is a cross-sectional view showing a first sheath grown on the first mandrel.
FIG. 2C is a cross-sectional view of the first sheath formed on the first mandrel; after the mandrel is removed.
Figure 3:
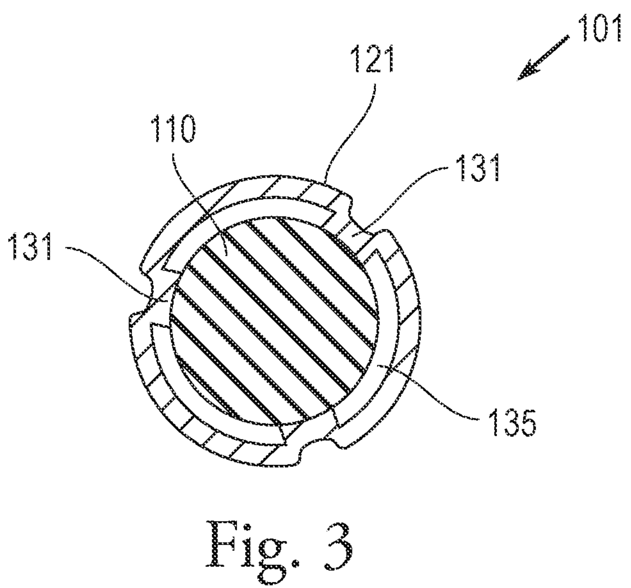
FIG. 3 is a cross-sectional view of a lightpipe according to a second embodiment.

Once the first mandrel 20 is manufactured having the desired specifications (FIG. 2A), the next step is to form the sheath 120 using the CVD process. As is known, a CVD process involves growing a target material, in this case SiC, on a substrate, in this case the first mandrel 20. The CVD process continues until the formed object (sheath 120) has the desired specifications (e.g., thickness), etc. FIG. 2B shows the formed sheath 120 on the first mandrel 20.

Next, as shown in FIG. 2C, the first mandrel 20 is removed using a suitable process that removes the mandrel material but leaves behind the formed sheath 120 in a fully intact state. For example, the mandrel material can be removed by burning or etching the mandrel material which results in the first mandrel 20 being fully removed from the inside of the formed sheath 120. As the mandrel material is removed, the sheath 120 is exposed. SiC materials have a natural oxide layer that protects the SiC sheath from oxidation at elevated temperatures and thus, the removal of the first mandrel using an etchant or the like does not adversely impact or damage and mar the sheath.

The complete removal of the mandrel material leaves behind the formed sheath 120. As shown in FIG. 2C, the formed sheath 120 has an inner lumen defined by an inner surface (inner face or inner diameter) of the formed sheath 120. The local protrusions 130 are formed along the inner surface and extend radially inward into the inner lumen. In FIG. 2C, there are at least three local protrusions 130 that are spaced equally apart (e.g., spaced 120 degrees apart).

In FIG. 2C, each local protrusion 130 is shown as having a generally arcuate (dome) shape; however, this is but one exemplary shape. In this illustrated shape, an inner face of the local protrusion 130 is curved. However, it will be appreciated that other shapes are equally possible including different shapes for the inner face for each local protrusion 130. For example, the inner face can have a flat shape. The inner core 110 has a cylindrical shape (rod shape) and thus, the inner faces of the local protrusions 130 represent contact points between the core 110 and the sheath 120 and more particularly, causes at least the distal end portion of the core 110 to maintain a centered position within the sheath 120.

The formed sheath 120 can undergo minor machining, beveling and tolerance control. For example, the sheath 120 and the local protrusions 130 must be manufactured to specifications such that local protrusions 130 contact and center the inner core 110 within the sheath 120. Conventional beveling and tolerance control techniques can be used.

Once completed, the optical pyrometer 100 is assembled by inserting the core 110 into the hollow sheath 120. As mentioned, the local protrusions 130 act to center the core 110 within the sheath 120.

In this way, the optical pyrometer 100 is formed and assembled and can include a sapphire rod (core 110) and a SiC outer sheath 120 that is formed by a CVD process.

Second Manufacturing Method

Now turning to FIGS. 3, 4A-4C, 5, 6 and 8, a second manufacturing method is illustrated and includes the use of a second mandrel 10. The second mandrel 10 can be thought of as being a fluted mandrel in that the second mandrel 10 includes a plurality of channels or grooves formed therein. The second mandrel 10 thus has a distal end and an opposite proximal end. The second mandrel 10 will traditionally have a cylindrical shape and contains a plurality of flutes 14 that extend longitudinally along a length of the second mandrel 10. For example, the plurality of flutes 14 can extend the entire length of the first mandrel 10 or can be formed to extend less than the entire length. The plurality of flutes 14 are formed circumferentially about the second mandrel 10. For example, there can be at least two flutes 14 (e.g., spaced 180 degrees apart); however, more common is for the second mandrel 10 to have three or more flutes 14. Preferably, the plurality of flutes 14 are equally spaced apart from one another. Each flute 14 is in the form of a recessed groove or channel formed in the outer surface of the second mandrel 10. It will be appreciated that the flutes 14 represent the negative (inverse) impression of the local protrusions 131 that are formed as part of the final sheath 121. Thus, the selected depth of the flute 14 is selected in view of the intended and desired size of the local protrusions 131 formed in the final sheath 121 since the degree of the recess formed in the second mandrel 10 directly corresponds to the degree of which the local protrusions 131 protrude (in a radial inward direction) from an inner surface of the sheath 121 as described herein. Moreover, the size of the annular space 135 is determined by the size of the local protrusions 131. In particular, as the height of the local protrusions 131 increases, the size of the annular space 135 likewise increases.

Since the flutes 14 are in the form of channels or grooves, the local protrusions 131 formed along the sheath 121 can be thought of as being rails (longitudinal rails).

The second mandrel 10 can be formed of any number of suitable materials. For example, the second mandrel 10 can be formed of graphite and the plurality of flutes 14 can be machined into the graphite mandrel.

Once the second mandrel 10 is manufactured having the desired specifications (FIG. 4A), the next step is to form the sheath 121 using the CVD process. As is known, a CVD process involves growing a target material, in this case SiC, on a substrate, in this case the first mandrel 10. The CVD process continues until the formed object (sheath 121) has the desired specifications (e.g., thickness), etc. FIG. 4B shows the formed sheath 121 on the first mandrel 10.

Next, as shown in FIG. 4C, the second mandrel 10 is removed as by sliding the second mandrel 110 out from the center of the formed sheath 121. This leaves behind the formed sheath 121. As shown in FIG. 4C, the formed sheath 121 has an inner lumen defined by an inner surface (inner face or inner diameter) of the formed sheath 121. The local protrusions 131 are formed along the inner surface and extend radially inward into the inner lumen. In FIG. 4C, there are three local protrusions (rails) 131 that are spaced equally apart (e.g., spaced 120 degrees apart).

In FIG. 4C, each local protrusion (rail) 131 is shown as having a generally rectangular shape; however, this is an exemplary shape and not limiting. In this illustrated shape, an inner face of the local protrusion 131 is planar (flat). However, it will be appreciated that other shapes are equally possible including different shapes for the inner face for each local protrusion 131. For example, the inner face can have an arcuate shape (concave) as opposed to the flat inner face shown in the figures. The inner core 110 has a cylindrical shape (rod shape) and thus, the inner faces of the local protrusions 131 represent contact points between the core 110 and the sheath 121 and more particularly, causes the core 110 to maintain a centered position within the sheath 121.

The formed sheath 121 can undergo minor machining, beveling and tolerance control. For example, the sheath 121 and the local protrusions 131 must be manufactured to specifications such that local protrusions 131 contact and center the inner core 110 within the sheath 121. Conventional beveling and tolerance control techniques can be used.

Once completed, the optical pyrometer 100 is assembled by inserting the core 110 into the hollow sheath 121. As mentioned, the local protrusions 131 act to center at least the distal end portion of the core 110 within the sheath 121.

In this way, the optical pyrometer 100 is formed and assembled and can include a sapphire rod (core 110) and a SiC outer sheath 121 that is formed by a CVD process.

Figure 5:
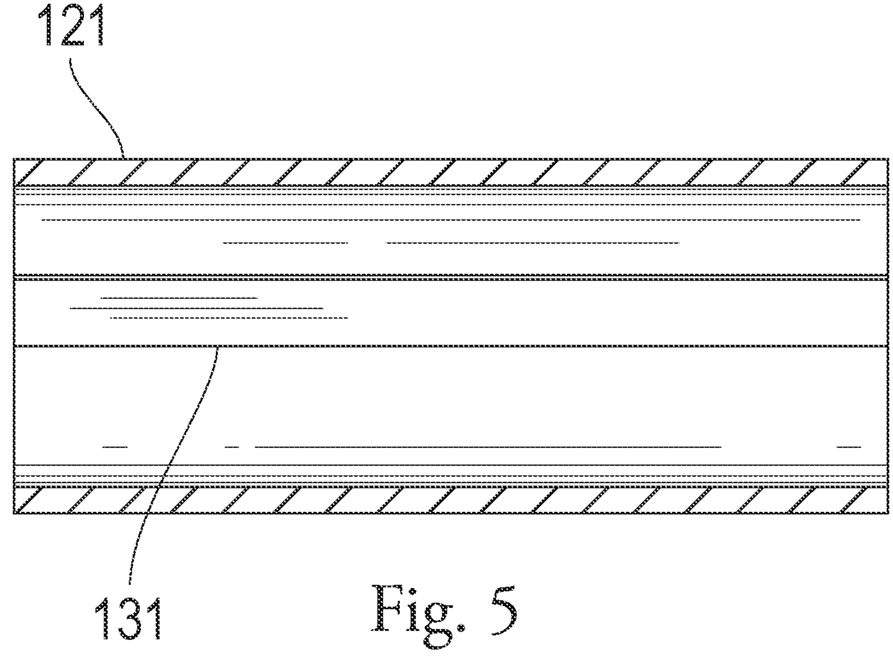
FIG. 5 is a cross-sectional view of the second sheath showing a ridge running the entire length thereof.
Figure 6:
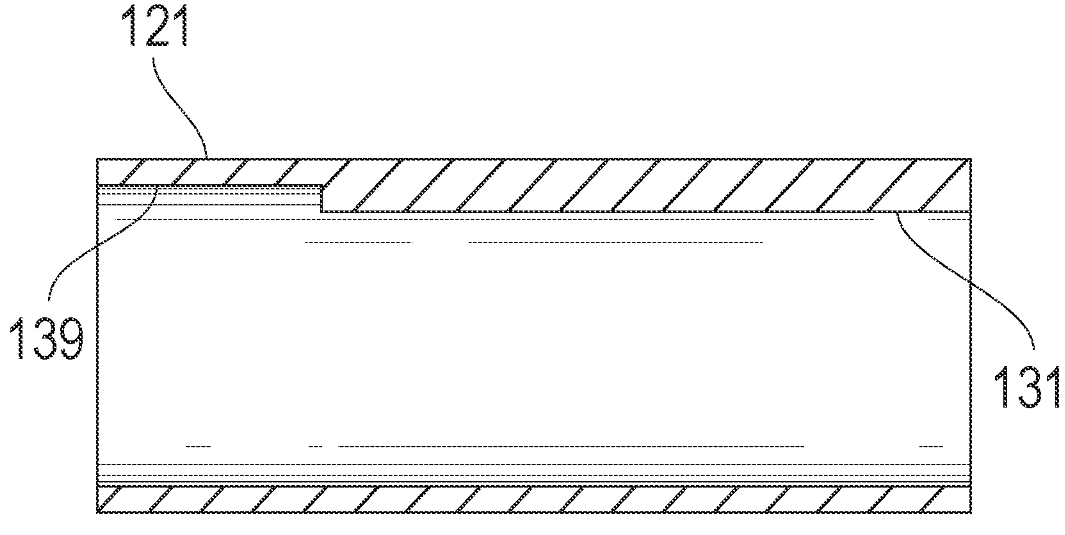
FIG. 6 is a cross-sectional view of the second sheath showing further machined sheath with partial removal of the ridge to create a continuous ring space for uniform purging at the distal end of the sheath.
Figure 7A:
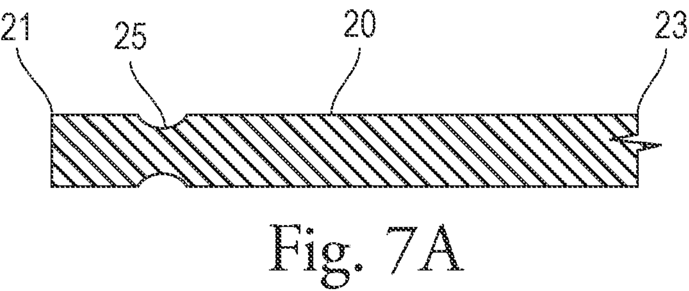
FIG. 7A is a view of the first mandrel.
Figure 7B:
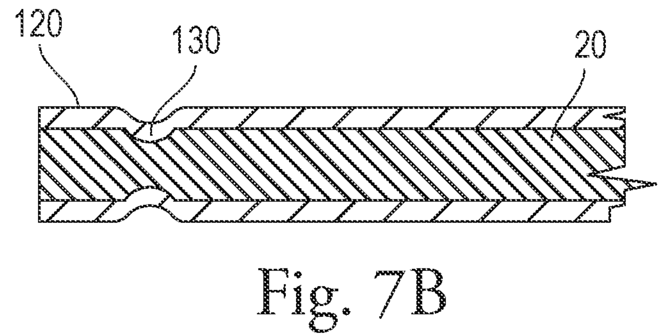
FIG. 7B shows the sheath grown on the first mandrel.
Figure 7C:
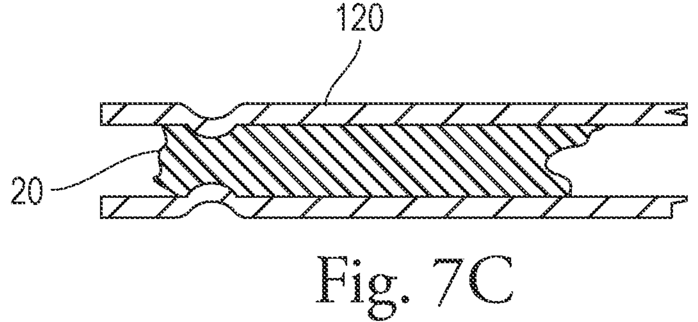
FIG. 7C shows a step of removing the first mandrel.
Figure 7D:
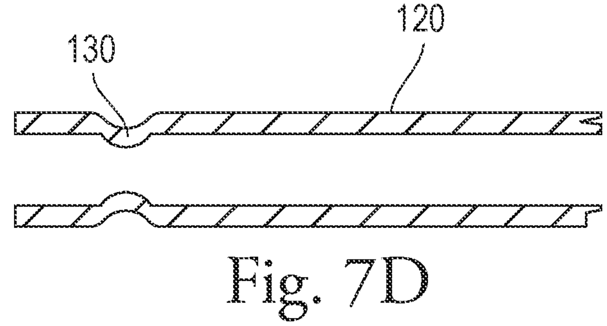
FIG. 7D shows the formed first sheath.

FIG. 5 illustrates the outer sheath 121 with each local protrusion (ridge or rail) 131 initially formed the entire length of the outer sheath 121. Post manufacture, at one end (distal end) of the outer sheath 121, the local protrusions 131 can be modified. More particularly, at the distal end, a length of each local protrusion can be removed to form an open annular space 139 at the end of the outer sheath 121 that is devoid of local protrusions 131 as shown in FIG. 6. The purpose of the annular space 139 without the local protrusions 131 is to allow the purging flow to even out before it comes out of the end of the lightpipe assembly, and to ensure that the flow is distributed uniformly. That could be done with grinding the outer sheath 121 formed in FIG. 5 to remove distal sections of each of the local protrusions 131 that initially run the whole sheath length. Alternatively, the mandrel can be formed with flutes 14 that do not extend that entire length and in particular, one end of the mandrel is devoid of flutes 14. When the outer sheath is formed (grown) in this manner to include partial local protrusions 131 (that do not run the entire length of the sheath), additional final touch-up by grinding can occur. This method is very useful when the design is a thinner-walled and deeper-grooved sheath. To create the ring space using grinding only would be a problem in that case, as the needed amount of material removal can be greater than what is available with the wall thickness.

In one embodiment, the length of the annular space 139 can be 30 mm as measured from the distal end of the lightpipe (to the local protrusion(s)). However, this is merely exemplary in nature and this length can vary from application to application. The size of this annular space 139 is selected in view of the following considerations: (1) a size that ensures that the exiting flow from the lightpipe is uniform, so a longer length without ridges helps, as it allows time for the flows to merge and stabilize; and (2) on the other hand when the lightpipe rod and the sheath are contact-free for too long a distance, the concentricity degrades and therefore, these two considerations need to be balanced.

Figure 8:
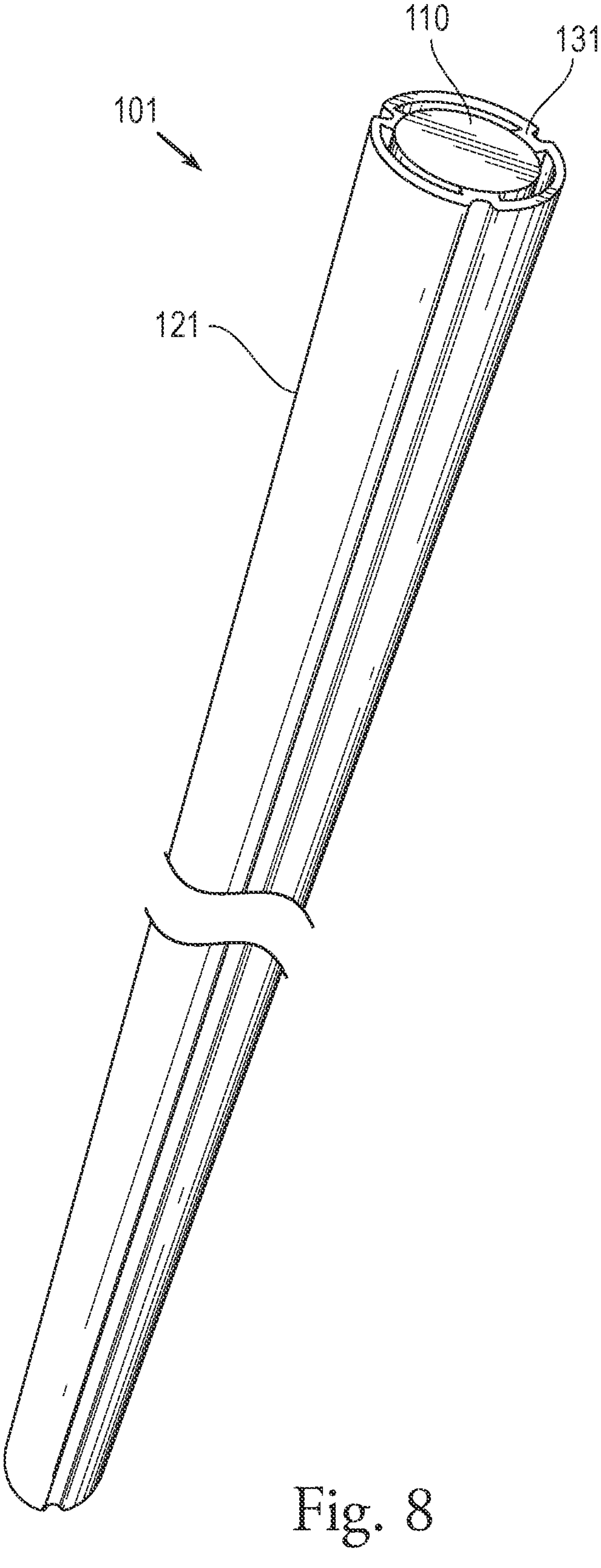
FIG. 8 is a perspective view of the lightpipe of FIG. 3.

FIG. 8 is a perspective view of the lightpipe 101.

The present disclosure describes an optical pyrometer that is suitable for use in high temperature substrate processing applications and in particular, discloses a lightpipe sheath formed of SiC and methods of manufacture thereof.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A substrate processing system comprising:

a processing chamber; and an optical pyrometer assembly, disposed within the processing chamber, to measure an emitted thermal radiation originating substantially from a portion of a target surface, the optical pyrometer assembly comprising:

a lightpipe that comprises a core and a hollow sheath surrounding the core, the core and the sheath being concentric with one another, wherein the sheath is formed by a chemical vapor deposition process and includes local protrusions within a hollow interior and along an inner surface thereof to maintain a position of the core within the sheath, wherein the core includes a plurality of local recessed areas formed within an outer surface of the core at locations of the local protrusions such that for each local protrusion there is one corresponding local recessed area formed adjacent to a corresponding local protrusion;

wherein a temperature of the target surface is determined from an intensity of a portion of the measured emitted thermal radiation near at least one wavelength.

2. The substrate processing system of claim 1, wherein the core comprises a sapphire rod and the sheath is formed of high-resistivity silicon carbide (SiC).

3. The substrate processing system of claim 1, wherein the local protrusions comprise bumps that are formed circumferentially within the hollow interior of the sheath.

4. The substrate processing system of claim 1, wherein the local protrusions comprise discrete ridges or rails that are formed circumferentially and extend longitudinally within the hollow interior of the sheath.

5. The substrate processing system of claim 1, further comprising an optical detector that is configured to receive an output from the lightpipe and to generate at least one signal representative of the emitted thermal radiation, and a temperature circuit that transforms the at least one signal into a temperature value of the target surface.

6. An optical pyrometer assembly for use in semiconductor processing equipment, the optical pyrometer comprising:

a lightpipe that comprises a core in the form of a sapphire rod and a hollow silicon carbide outer sheath surrounding the core, the core and the outer sheath being concentric with one another with only the sapphire rod being within a hollow interior of the outer sheath;

wherein the outer sheath includes local protrusions within the hollow interior and formed along an inner surface thereof to maintain a position of the core within the outer sheath, the local protrusions being in direct contact with the core; and wherein the core includes a plurality of local recessed areas formed within an outer surface thereof at locations of the local protrusions such that for each local protrusion there is one corresponding local recessed area formed adjacent the one corresponding local protrusion.

7. The optical pyrometer assembly of claim 6, wherein the local protrusions comprise bumps that are formed circumferentially within the hollow interior of the outer sheath.

8. The optical pyrometer assembly of claim 6, wherein the local protrusions comprise discrete ridges or rails that are formed circumferentially and extend longitudinally within the hollow interior of the outer sheath.

9. The optical pyrometer assembly of claim 6, wherein the local protrusions have inverse shapes relative to the local recessed areas, the inverse shapes having arcuate surfaces.

10. The optical pyrometer assembly of claim 6, wherein the local protrusions are ridges having rectilinear shapes and the local recessed areas are concave recesses.

* * * * *